(12) United States Patent
Kim

(10) Patent No.: US 6,614,738 B1
(45) Date of Patent: Sep. 2, 2003

(54) APPARATUS AND METHOD FOR CONTROLLING A REPRODUCTION SPEED OF AN OPTICAL DISK BASED ON A REMAINING BATTERY ENERGY

(75) Inventor: Sung-Taek Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 388 days.

(21) Appl. No.: 09/649,222

(22) Filed: Aug. 28, 2000

(30) Foreign Application Priority Data

Sep. 30, 1999 (KR) .......................................... 99-41946

(51) Int. Cl.[7] ................................................ G11B 7/00
(52) U.S. Cl. ................................ 369/53.18; 369/47.44; 369/53.3
(58) Field of Search ............................. 369/53.18, 53.3, 369/53.37, 44.27, 30.25, 47.44, 53.26

(56) References Cited

U.S. PATENT DOCUMENTS 5,787,292 A * 7/1998 Ottesen et al. .............. 713/300

* cited by examiner

*Primary Examiner*—Thang V. Tran
*Assistant Examiner*—Kim Lien T. Le
(74) *Attorney, Agent, or Firm*—Birch, Stewart, Kolasch & Birch, LLP

(57) ABSTRACT

The present invention relates to method and apparatus for controlling disk reproduction speed to extend an operable time of a portable device such as a notebook computer using a battery as a power source. A method for adjusting a disk reproduction speed based on a remaining battery energy according to the present invention, at the part of a portable device such as a notebook computer, detects an amount of the remaining battery energy, and sends a data indicating the detected amount of the remaining battery energy to a connected disk device, and, at the other part of a disk device, reduces a disk reproduction speed based on the data sent by the portable device. The method and apparatus for controlling disk reproduction speed according to the present invention can extend an operable time of the portable device whose operating power is supplied from an equipped battery whose storage capacity is restricted.

21 Claims, 5 Drawing Sheets

FIG. 3

| AC Power | Battery Power | output value of the power level detecting circuitry |
|---|---|---|
| Y | Y | 1 |
| Y | N | 1 |
| N | Y | 0 |
| N | N | X (Don't Care) |

FIG. 4

| output value of 2-bit A/D converter | amount of charged electric energy |
|---|---|
| 11 | fully charged |
| 10 | 3/4 charged |
| 01 | 1/2 charged |
| 00 | 1/4 charged |

FIG. 5

*syntax of a packet command for the remaining battery energy*

| Bit<br>Byte | 7 | 6 | 5 | 4 | 3 | 2 | 1 | 0 |
|---|---|---|---|---|---|---|---|---|
| 0 | Operation Code (EFh) ||||||||
| 1 | not used |||||| remaining battery energy (2 bits) ||

FIG. 6

| Address |||||  Functions ||
|---|---|---|---|---|---|---|
| CS1FX | CS3FX | DA2 | DA1 | DA0 | Read(DIOR) | Write(DIOW) |
| ||||| Control Block Registers ||
| N | A | 0 | 0 | 0 | Floppy A Status | Unused |
| N | A | 0 | 0 | 1 | Floppy B Status | Unused |
| ⋮ | ⋮ | ⋮ | ⋮ | ⋮ | ‑‑‑‑‑‑‑‑ | ‑‑‑‑‑‑‑‑ |
| ||||| Command Block Registers ||
| A | N | 0 | 0 | 0 | Data ||
| ⋮ | ⋮ | ⋮ | ⋮ | ⋮ | ‑‑‑‑‑‑‑‑ | ‑‑‑‑‑‑‑‑ |
| A | N | 1 | 1 | 1 | ATAPI Status | ATA Command |

[A : signal asserted,  N : signal negated]

US 6,614,738 B1

APPARATUS AND METHOD FOR CONTROLLING A REPRODUCTION SPEED OF AN OPTICAL DISK BASED ON A REMAINING BATTERY ENERGY

BACKGROUND OF THE INVENTION

1. Field of the Invention

The present invention relates to a method and apparatus for controlling a reproduction speed of a disk device to extend an operable time of a portable device, which equips the disk device, such as a notebook using a battery as a power source.

2. Description of the Related Art

A portable computer such as a notebook is being widely popularized as its weight and size is getting lighter and smaller. The portable computer is not operable for a long time greater than about two or three hours without an external power since a battery has a restricted capacity to store electric energy.

However, the disk device to be installed in or connected to the portable computer is getting higher in a reproduction speed rapidly, which causes the portable computer to dissipate more and more electric power so that the operable time is decreased although a storage capacity of a battery is increased as a result of technical development.

Moreover, a high-speed disk device always rotates an inserted disk at a fixed high speed for every data access, which causes a time delay until the data on disk the starts to be read out after a high target speed is reached, and also reduces power-supplying time of a battery installed in the portable computer.

SUMMARY OF THE INVENTION

It is an object of the present invention to provide a method and apparatus for adjusting a reproduction speed of an optical disk inserted in a disk device based on a remaining battery energy and whether or not an external power is supplied to a portable computer.

It is another object of the present invention to provide a method and apparatus for adjusting a reproduction speed of an optical recording medium, which overcome problems and limitations associated with the related art.

A method for adjusting a disk reproduction speed based on a remaining battery energy according to an embodiment of the present invention, at the part of a portable computer, detects an amount of the remaining battery energy, and sends a data indicating the detected amount of the remaining battery energy to a connected disk device, and, at the other part of the disk device, decreases a disk reproduction speed based on the contents of the data sent by the notebook computer.

An apparatus for adjusting a disk reproduction speed based on a remaining battery energy according to an embodiment of the present invention comprises an interfacing unit for sending or receiving data to/from a connected host; a controller reading information regarding an amount of electric energy charged in an outer battery from a data received through said interfacing unit and determining a disk reproduction speed to be lower than a maximum speed based on the read information; and a driver driving a disk to rotate at the determined reproduction speed.

BRIEF DESCRIPTION OF THE DRAWINGS

The accompanying drawing which are included to provide a further understanding of the invention, illustrate the preferred embodiments of the invention, and together with the description, serve to explain the principles of the present invention.

In the drawings:

FIG. 3 is an example of output data of a power detecting circuitry, which is equipped in a notebook computer, detecting whether an external power is supplied or not;

FIG. 4 is an example of output data of an A/D converter, which is equipped in a notebook computer, detecting how much a battery is charged;

FIG. 5 illustrates a ATAPI protocol format of a packet command for delivering information of an electric energy stored in a battery;

FIG. 6 shows signal state and its related function for I/O signal pins of an ATAPI interface.

DETAILED DESCRIPTION OF THE PREFERRED EMBODIMENTS

In order that the invention may be fully understood, preferred embodiments thereof will now be described with reference to the accompanying drawings.

Figure 1:
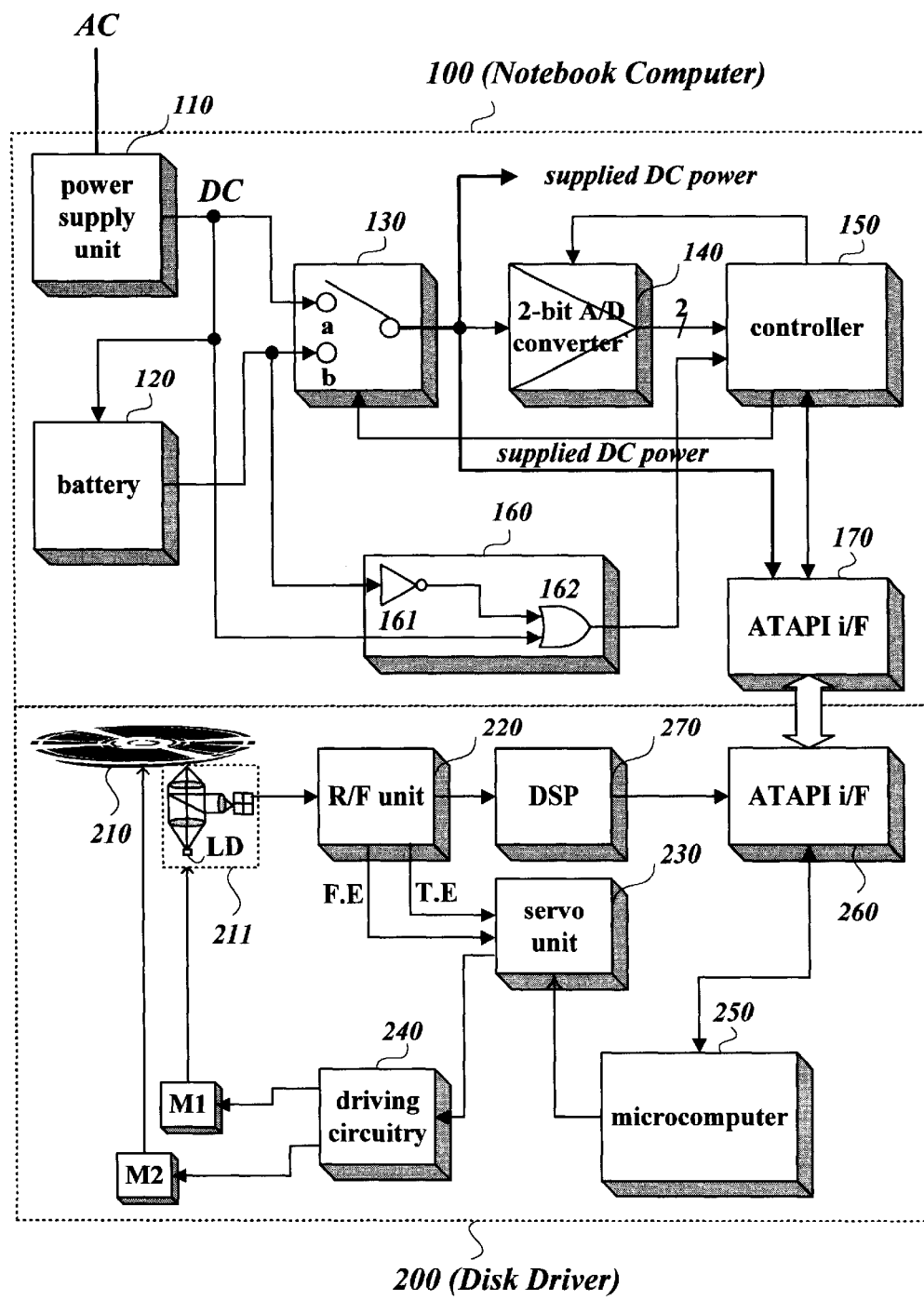
FIG. 1 shows a block diagram of a notebook computer, to which a disk reproduction speed controlling method according to an embodiment of the present invention is applied, and partial elements of a disk device which is connected to the notebook through an ATAPI interface.

FIG. 1 is a block diagram of a notebook computer, to which a disk reproduction speed controlling method according to the present invention is applied, and partial elements of a disk device which is connected to the notebook through an ATAPI interface which is one of interfacing standards for a personal computer.

The notebook computer 100 of FIG. 1 comprises a power supplying unit 110 rectifying an AC power supplied from an outer source into a DC power and supplying the rectified DC power to all internal elements and a disk device 200; a battery 120 storing an electric energy supplied from the DC power and supplying the stored energy to other elements if necessary; a power selector 130 selecting one power source from the power supply unit 110 and the battery 120; an A/D converter 140 converting an analog input signal into digital data; a power detecting circuitry 160 detecting whether an external power is being supplied or not; a controller 150 detecting a remaining amount of electric energy charged in the battery 120 based on the digital data converted by the A/D converter 140; and an ATAPI interface 170 for sending/receiving data to/from the disk device 200 according to the ATAPI interface protocol. All these elements are operatively coupled.

The disk device 200 of FIG. 1 comprises an optical pickup 211 reproducing recorded signals from an optical disk 210; driving unit 240 for driving the sled motor M1 for moving the pickup 211 and the spindle motor M2 for rotating the disk 210; an R/F unit 220 outputting servo error signals TE and FE and binary signals through combining signals reproduced from the optical disk 210 by the optical pickup 211;

a digital signal processor (DSP) 270 processing the binary signals received from the R/F unit 220 to restore them into digital data; a servo unit 230 for providing control input to the driving unit 240 and the pickup 211; an ATAPI interface 260; and a microcomputer 250 determining a desired reproduction speed of the disk 210 based on the contents of a packet command received through the ATAPI interface 260 and controlling the driving unit 240 to rotate the disk 210 at the determined reproduction speed.

Figure 2:
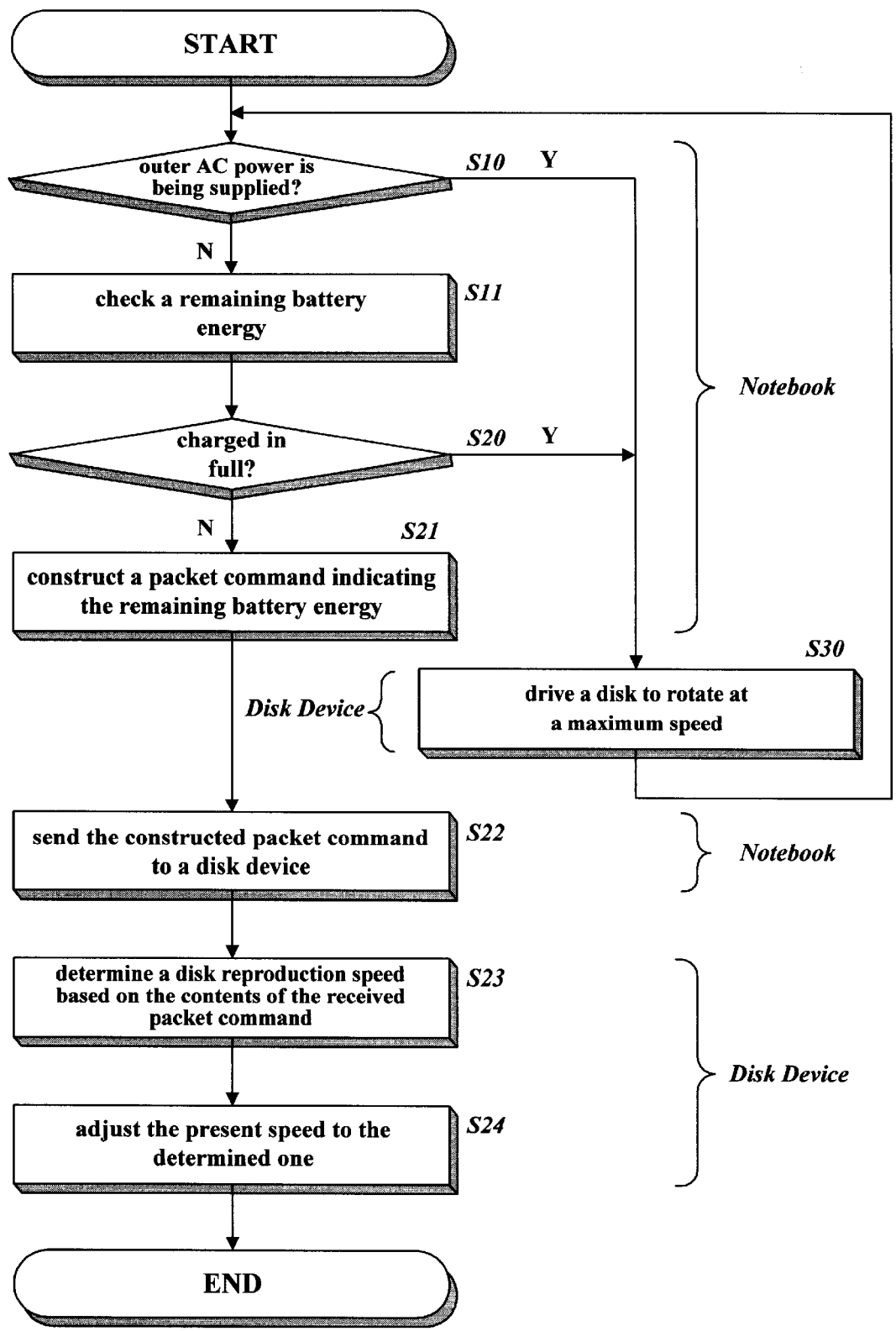
FIG. 2 is a flow diagram embodying a method for controlling a reproduction speed of a disk device based on a remaining battery energy according to an embodiment of the present invention.

FIG. 2 is a flow diagram embodying a method for controlling a reproduction speed of a disk based on a remaining battery energy. The flow diagram is now explained in detail together with the corresponding operations of the disk device 200 and the notebook computer 100 of FIG. 1.

When an AC power line is connected to the power supplying unit 110, then the power supplying unit 110 rectifies the AC power into a DC power which charges the battery 120.

The controller 150 keeps monitoring whether the AC power is being supplied or not (S10) based on the output value of the power detecting circuitry 160 which is composed of an inverter 161 and an OR gate 162. If the AC power is being supplied, the output of the power detecting circuitry 160 is high, that is, logic state 1 as described in the truth table of FIG. 3. If the output is high, the controller 150 applies a control signal to the power selector 130 in order that the power applied to 'a' terminal may be supplied. Therefore, in the condition that the AC power line is connected, the DC power rectified from the AC is supplied to every component of the notebook 100 and the disk device 200.

Under the AC-power-supplied condition, the controller 1150 does not send any packet command involved in a disk reproduction speed to the disk device 200. Therefore, the microcomputer 250 of the disk device 200 rotates an inserted disk 210 at a predetermined high speed (S30) by applying a driving current corresponding to the predetermined high speed to the spindle motor M2 through the servo unit 230 and the driving unit 240.

However, if the AC power line is disconnected, the power supplying unit 110 can not supply the rectified DC power, so that an electric energy charged in the battery 120 needs to be discharged, which means that the two inputs applied to the OR gate 162 are all low, that is, logic state 0. Therefore, the output of the power detecting circuitry 160 is changed to logic state 0 as described in the truth table of FIG. 3.

The controller 150, which keeps monitoring the output of the power detecting circuitry 160, detects the output transition of the power detecting circuitry 160 and becomes aware that the AC power is not being supplied. Then it makes the power selector 130 switch its input from the 'a' terminal to the 'b' terminal.

According to the switching of the power selector 130, the electric energy charged in the battery 120 starts to be supplied to all components of the notebook 100 and the disk device 200. At this time, the controller 150 receives the digital data, which indicates the current remaining battery energy, converted by the A/D converter 140, and then knows how much the battery 120 has been charged (S11) based on the received data.

FIG. 4 shows the relation between the converted 2-bit data and the remaining electric energy of the battery 120. For example, if the converted 2-bit data is 01b, the controller 150 considers that the battery 120 has been charged by a half of its charging capacity.

The converted data for the same remaining battery energy may be different from the values of FIG. 4 due to the biased offset voltage of the A/D-converter 140.

After knowing the remaining energy of the battery 120, if the charged energy is not full (S20), the controller 150 constructs a packet command to represent the magnitude of a remaining battery energy (S21) as shown in FIG. 5 according to the ATAPI protocol, and transmits the constructed packet command to the disk device 200 (S22) through the ATAPI interface 170 by executing the following operations.

The controller 150 controls the ATAPI interface 170 to set its port signals sequentially to conduct transmission of an ATAPI packet command. According to the sequential control of the controller 150, the data of 00A0h, which is to notify that an ATAPI packet command will follow, is carried on the data lines D0~D15 at first, then, the signal pins of DA0~DA2 are set to 1, and finally the signal pin of 'CS1FX' is asserted for the data 00A0h to be caught by the counter ATAPI interface 260. FIG. 6 shows signal state and its related function for I/O signal pins of an ATAPI interface.

After then, the controller 150 sends a 2-byte packet command, whose first operand for a command code is EFh and the second operand contains information indicating the magnitude of the remaining battery energy, to the disk device 200 through the ATAPI interface 170. The command code EFh is a value not assigned in the present specification of the ATAPI protocol yet.

The ATAPI interface 260 of the disk device 200 receives the 2-byte packet command following the data 00A0h, and transfers it to the microcomputer 250. The microcomputer 250 identifies the received packet command as information for the remaining battery energy based on the first operand code whose value is EFh, reads 2-bit data indicating the magnitude of the remaining battery energy from the second operand, and determines a reproduction speed based on the read 2-bit value (S23).

After the determination of a reproduction speed, the microcomputer 250 adjusts the reproduction speed of the inserted disk 210 to the pre-specified speed which is proportional to the remaining battery energy (S24). For example, supposed that the maximum speed of the disk device 200 is 32X, if the remaining energy is ¾, then the adjusted speed becomes to 24X; if ½, then 16X; and if ¼, then 8X, and so on. That is, the reproduction speed of the disk 210 may be selected proportional to the amount of energy remaining in the battery 120.

In the above embodiment, the disk device 200 determines the disk reproduction speed based on the contents of the packet command received from the notebook 100.

However, in another embodiment of the present invention, the controller 150 of the notebook 100 may determine the reproduction speed corresponding to the detected remaining battery energy, and send a packet command notifying the determined reproduction speed to the disk device 200.

Figure 7:
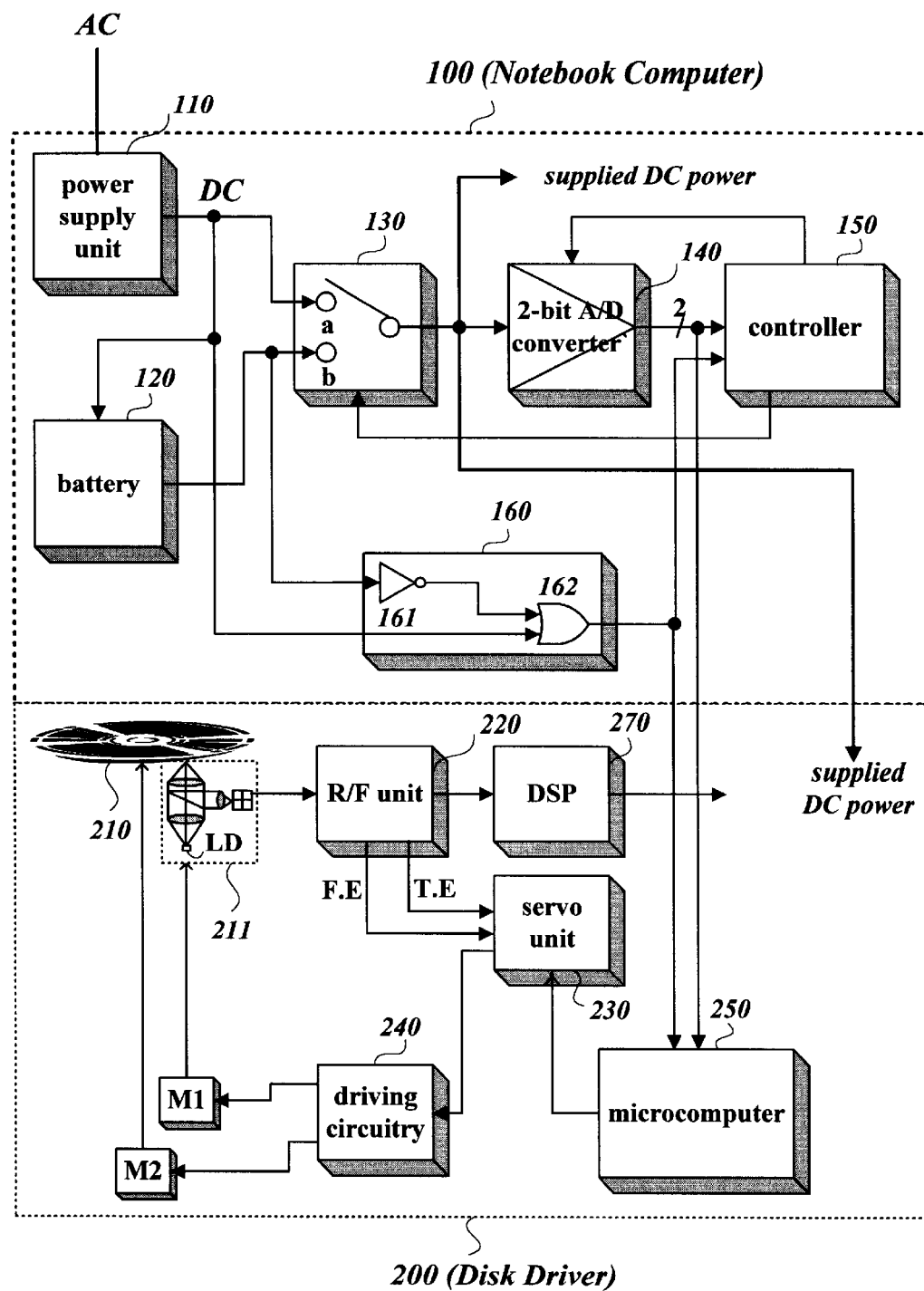
FIG. 7 shows a block diagram of a notebook computer, to which another disk reproduction speed controlling method according to the present invention is applied, and partial elements of a disk device which is connected to the notebook through an ATAPI interface.

FIG. 7 shows a block diagram of a notebook computer, to which another disk reproduction speed controlling method according to the present invention is applied, and partial elements of a disk device which is connected to the notebook through a ATAPI interface. The structure of FIG. 7 is different from that of FIG. 1 in that the signals notifying the power-supplying state and the amount of the remaining battery energy are delivered through additional exclusive lines instead of the ATAPI interface.

In the embodiment of FIG. 7, the outputs of the power detecting circuitry 160 and the A/D converter 140 are to be connected directly to the microcomputer 250 of the disk device 200. The microcomputer 250 checks whether or not the outer AC power is being supplied through the notebook 100 based on the output value of the power detecting circuitry 160, and, if the AC power is being supplied, it rotates the disk 210 at the allowable maximum speed, otherwise, checking the output value of the A/D converter 140 to know how much the battery has been charged. After then, the microcomputer 250 determines the reproduction speed in the manner of the aforementioned example, and reduces the reproduction speed to the determined speed, if the current speed is higher than the determined one.

The method and apparatus for controlling disk reproduction speed based on the remaining battery energy can extend an operable time of a portable device such as a notebook computer whose operating power is supplied from an equipped battery whose storage capacity is restricted.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. A method for controlling a disk reproduction speed, comprising the steps of:
    (a) detecting an amount of a remaining battery energy;
    (b) sending a data indicating the detected amount of remaining battery energy to a connected disk device; and
    (c) determining a disk reproduction speed at the disk device based on the contents of the data,
    wherein said step (c) determines the disk reproduction speed proportionally to the amount of remaining battery energy indicated in the data.

2. The method set forth in claim 1, wherein said step (b) sends the data according to a bus protocol specified for a personal computer.

3. The method set forth in claim 2, wherein said step (b) sends the data in a format of a packet command conforming to an ATAPI protocol.

4. The method set forth in claim 1, further comprising the step of adjusting the present reproduction speed to the determined disk reproduction speed.

5. The method set forth in claim 1, wherein said steps (b) and (c) are conducted under the condition that an external AC power is not being supplied.

6. A method for controlling a disk reproduction speed, comprising the steps of:
    (a) detecting an amount of a remaining battery energy;
    (b) determining a disk reproduction speed of a connected disk device in accordance with the detected amount of remaining battery energy; and
    (c) sending a data indicating the determined reproduction speed to the disk device.

7. The method set forth in claim 6, wherein said step (c) sends the data according to a bus protocol specified for a personal computer.

8. The method set forth in claim 7, wherein said step (c) sends the data in a format of a packet command conforming to an ATAPI protocol.

9. The method set forth in claim 6, further comprising the step of adjusting the present reproduction speed to the speed indicated by the data.

10. The method set forth in claim 6, wherein said step (b) determines the disk reproduction speed proportionally to the detected amount of remaining battery energy.

11. The method set forth in claim 6, wherein said steps (b) and (c) are conducted under the condition that an external AC power is not being supplied.

12. A recording medium device for controlling a disk reproduction speed of a recording medium, comprising:
    an interface sending and/or receiving data to and/or from a connected host;
    a controller reading information regarding an amount of an electric energy charged in an outer battery from a data received through said interface, and determining a recording medium reproduction speed in accordance with the read amount of the electric energy; and
    a driver driving the recording medium to rotate at the determined reproduction speed.

13. The apparatus set forth in claim 12, wherein said interface communicates a data with the connected host according to a bus protocol specified for a personal computer.

14. The apparatus set forth in claim 12, wherein said controller determines the recording medium reproduction speed proportionally to the read amount of the electric energy.

15. The apparatus of claim 12, wherein said controller receives said information in a 2-byte packet.

16. The apparatus of claim 12, wherein the recording medium is a disk.

17. A host apparatus for controlling a recording medium reproduction speed of a connected recording medium drive device, the host apparatus comprising:
    a detector detecting an amount of electric energy remaining in a battery and generating digital data indicating the detected amount of the electric energy; and
    a controller receiving the digital data from the detector and determining a recording medium reproduction speed in accordance with the detected amount of the electric energy, whereby a recording medium is driven to rotate at the determined reproduction speed.

18. The host apparatus of claim 17, further comprising:
    an interface transmitting data on the determined reproduction speed from the host apparatus to the recording medium drive device.

19. The host apparatus of claim wherein the controller outputs data on the determined reproduction speed directly to a microcomputer of the recording medium drive device.

20. The host apparatus of claim 17, wherein the controller determines the recording medium reproduction speed proportionally to the detected amount of the electric energy.

21. The apparatus of claim 17, wherein the recording medium is a disk.

\* \* \* \* \*